Figure 1:
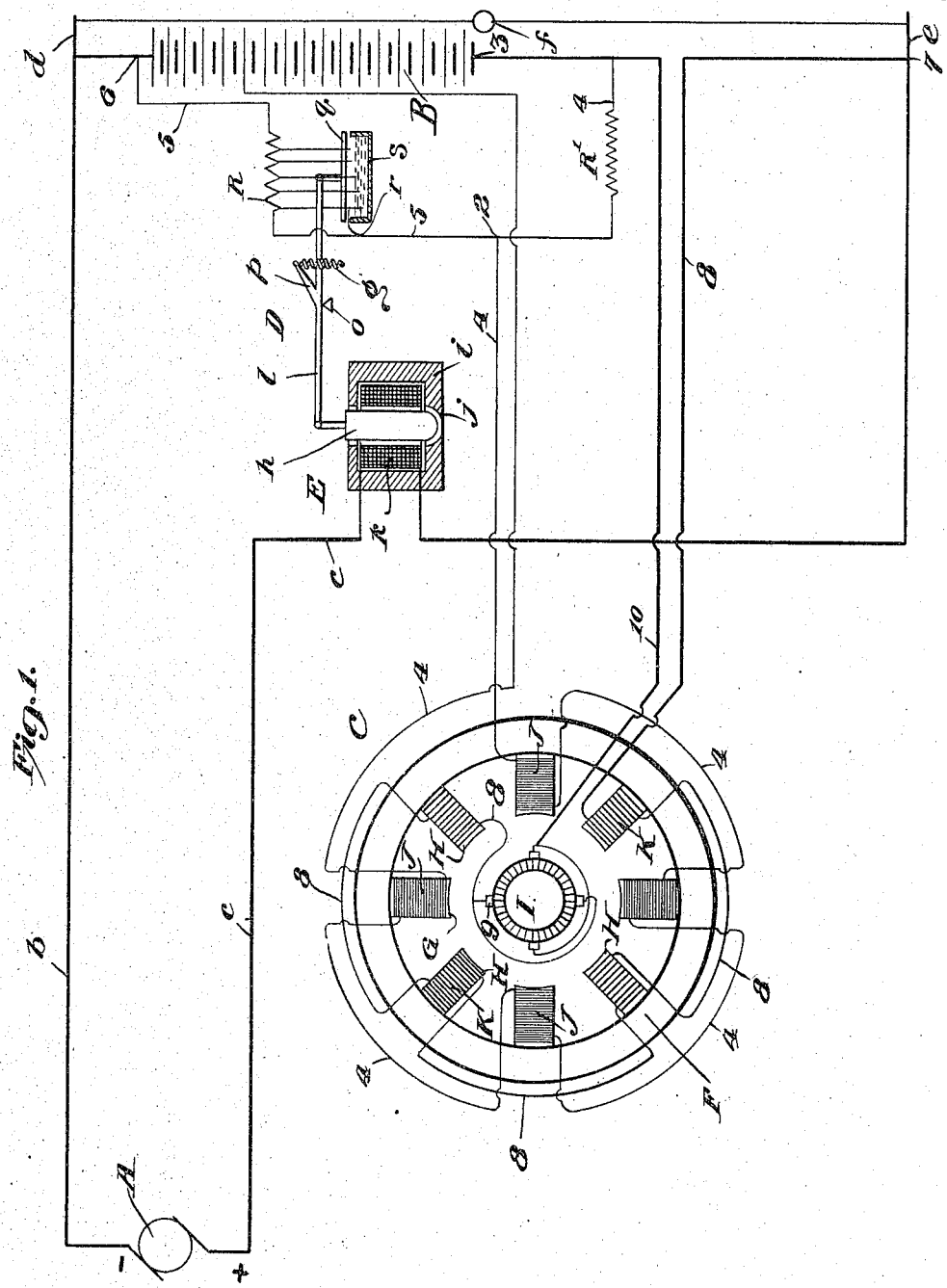

No. 898,030. PATENTED SEPT. 8, 1908.
J. BIJUR.
SYSTEM OF REGULATION.
APPLICATION FILED APR. 4, 1906.

3 SHEETS—SHEET 1.

Attest:
E. Mitchell
A. L. O'Brien

Inventor:
Joseph Bijur
by Dickerson, Brown, Raegener & Binney
Attys

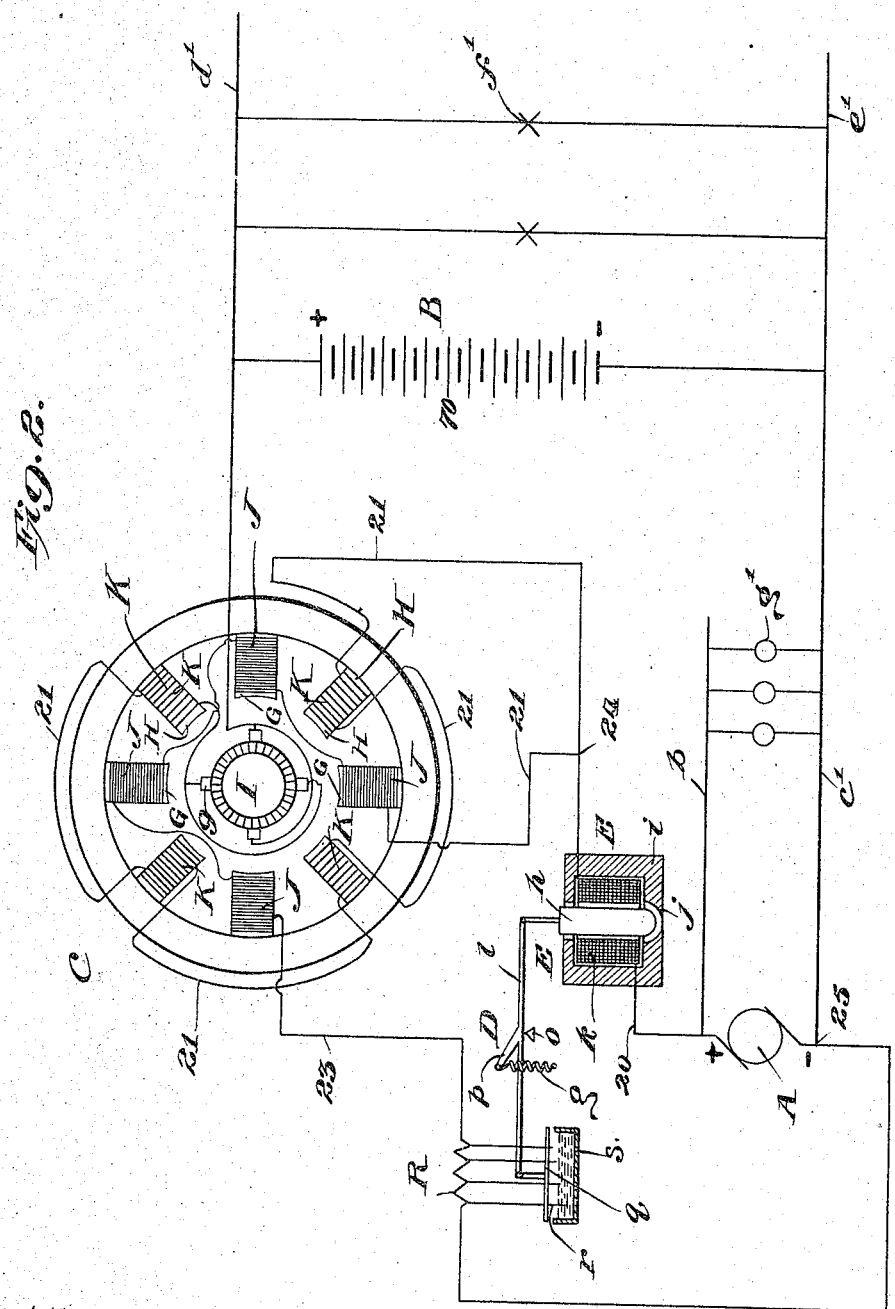

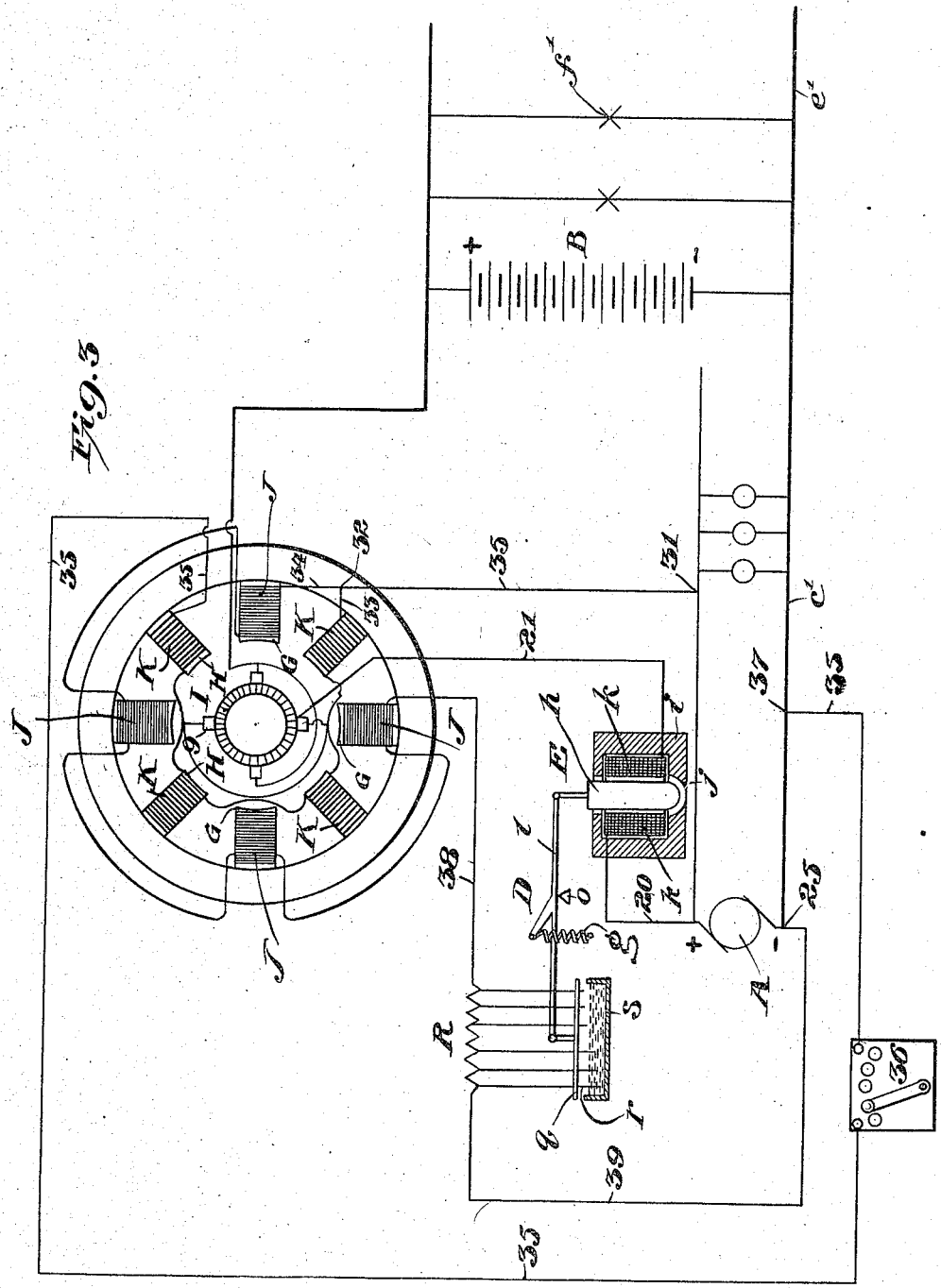

UNITED STATES PATENT OFFICE.

JOSEPH BIJUR, OF NEW YORK, N. Y., ASSIGNOR TO THE GENERAL STORAGE BATTERY COMPANY, A CORPORATION OF NEW YORK.

SYSTEM OF REGULATION.

No. 898,030.  Specification of Letters Patent.  Patented Sept. 8, 1908.

Application filed April 4, 1906. Serial No. 309,767.

*To all whom it may concern:*

Be it known that I, JOSEPH BIJUR, a citizen of the United States, and resident of the borough of Manhattan, city, county, and State of New York, have invented certain new and useful Improvements in Systems of Regulation, of which the following is a specification, accompanied by drawings.

This invention relates to systems of electric regulation, distribution and control, but more particularly to those systems in which a storage battery is used to compensate for variations on the line, controlled by a booster.

The objects of the invention are to improve upon the construction and operation of such systems and increase their efficiency.

Another object of the invention is to improve upon the commutation obtained at the booster and thus permit the booster to carry large currents at low voltages successfully.

Further objects of the invention will hereinafter appear and to these ends the invention consists of a system of electric regulation, distribution and control for carrying out the above objects embodying the features of construction, combinations of elements and arrangement of parts having the general mode of operation substantially as hereinafter fully described and claimed in this specification, and shown in the accompanying drawings, in which,—

Figures 1, 2 and 3 are diagrammatic representations of circuits and apparatus for carrying out the invention.

Referring to the drawings A represents the main generator to which are connected the mains *b* and *c*. The mains *d* and *e* represent the line and *f* represents the load which may be in the form of lamps or other translating devices. Across the line is connected the storage battery B, in circuit with which is connected the booster C, which is so constructed and arranged that according to the direction and amount of current in its field windings, the storage battery is caused to charge or discharge and thus compensate for variations on the line.

Automatic means are provided for varying the direction and amount of current in the field of the booster C, in this instance a regulator D being provided, having a substantially constant pull magnet E preferably connected as in this instance in the line C, which is maintained substantially constant and opposed by a substantially constant force due to the spring *g*. A variable resistance R is connected to be controlled by the regulator D and thereby control the direction and amount of current in the field windings of booster C.

The booster C is so constructed that greatly improved commutation is obtained and sparking is practically eliminated. In this instance a machine of the interpole type is used, in which F represents the field ring having the main poles G shunt wound and energized from any suitable source which may be controlled as the storage battery B. Interposed between the poles G are the auxiliary poles H series wound in series with the armature I and connected therefor in circuit in series with the battery B across the line. The object of the interposed auxiliary poles H is to counteract or neutralize the cross magnetization due to the armature, which is one of the chief causes of sparking as well understood. In this instance four brushes and four main poles are shown with four auxiliary poles, but it is to be understood that this construction and arrangement is merely by way of illustration and may be varied as desired.

The main field windings J are energized as follows: from the positive side 3 of the battery a wire 4 leads to the fixed resistance R' and from thence to the potential point 2 and then continues to the main field windings J which are all connected by said wire 4, and from said windings the wire 4 leads to the point 1 on the storage battery substantially two-thirds of the distance from the positive pole to the negative pole which is a preferable arrangement, the point 1 constituting another potential point on the sytem. From the potential 2 the wire 5 leads to the variable resistance R and from thence to the negative pole 6 of the battery. By varying the resistance R the relative potentials of the points 2 and 1 are varied and thereby the direction and amount of current in the main field windings J is varied to vary the direction and amount of current output of the booster. The auxiliary series field windings K are all connected in series between the point 7 on the line *e* by means of the wire 8, the brushes 9 and the wire 10 which leads to the positive pole 3 of the battery.

The constant pull magnet E may be constructed in any suitable manner, in this instance the core $h$ having a rounded end and the field $i$ also having a rounded or concave socket $j$ coöperating with the rounded end of the core $h$. The field winding $k$, as shown, surrounds substantially the length of the core $h$. According to this construction a substantially constant pull is obtained on the core throughout its range of movement as well understood. The core $h$ is connected to a lever $l$ pivoted at $o$ and provided with an arm $p$ extending upwardly at an angle therefrom on the other side of the fulcrum to which the spring $g$ is connected so that the moment of the spring is substantially constant throughout the range of movement. At the opposite end of the lever $l$ is provided an arm $q$ having stepped contact points $r$ adapted to dip into mercury in the cup $s$, and these points are connected respectively to sections of the variable resistance R whereby movement of the contact points $r$ due to movements of the magnet core $h$ vary the resistance R.

In the operation of the apparatus let it be assumed that the load on the line increases beyond the normal, in which case the magnet E attracts its core more strongly and some of the contact points $r$ are raised out of the mercury in the cup $s$, thereby cutting more of the variable resistance R into circuit and raising the potential of the point 2 above that of the point 1. Current will therefore flow from the positive pole 3 of the storage battery by wire 4, through resistance R', to the point 2, thence by wire 4 through the main field windings J of the booster and back by wire 4 to the point 1 on the battery. The booster will generate current in a direction to cause the storage battery to discharge and thereby furnish current to the line to compensate for the increased load, and the load on the main generator A will be maintained substantially constant. The series windings K will also be energized and by reason of their arrangement and position will prevent sparking.

When the load on the line decreases below the normal the spring $g$ overcomes the pull of the magnet E and the points $r$ are dipped into the mercury, thereby cutting resistance R out of circuit and raising the potential of point 1 above that of the point 2, in which case current will flow from point 1 by wire 4, to and through the main field windings J to the point 2 and thence by wire 5 through the variable resistance R to the negative pole of the battery, thereby energizing the booster field in a direction to cause the booster to generate current and charge the battery to compensate for decreased load on the line.

I am not to be understood as limiting myself to the particular form of regulator D shown, as it will be understood by those skilled in the art that a number of different kinds of regulators may be constructed and applied with different arrangements of circuits for carrying out the objects of the invention without departing from the spirit thereof.

In the operation of a reversible booster in series with a battery and in conjunction with a generator, the two together supplying a variable load, it is customary to choose such a number of cells that when the load on the generator is normal, current will neither flow into nor out of the battery. In this condition the voltage of the booster is zero and it passes no current. If the condition of the battery remained constant the voltage would be zero whenever the current was zero and the booster would not have to pass considerable current at zero voltage for whenever the booster was required to pass current, it would also be required to generate voltage in one direction or the other. It will also be understood that a most difficult condition for satisfactory commutation is when the booster is required to pass considerable current without generating voltage. This condition occurs when the battery, by reason of a more or less continuous overload or underload on the work circuit has changed its condition and hence its voltage, so that the voltage of all the cells in series is no longer equal to that of the line when they are neither absorbing nor furnishing current. In this condition the booster will be called upon to pass considerable current at zero voltage with a violent tendency to spark at the commutator. Assume that the battery by reason of an underload on the work circuit has risen in voltage when therefore the load on the work circuit is normal the booster will have to oppose or crush the voltage of the battery in order to prevent it furnishing current to the work circuit when the load is normal. Now if the load on the work circuit increases and the battery is to furnish the excess over the normal, the booster voltage opposing the battery will have to diminish while the current increases, and a point will be reached where the booster voltage is zero and the current through it heavy. This gives rise to bad commutation.

In accordance with this invention it will be seen that the interpole generator which carries out the functions of a booster is subjected to very different electrical conditions than those which would ordinarily obtain in the use of generators of this character designed to prevent sparking. Heretofore sparkless generators of the interpole type have merely been subjected to the ordinary conditions in systems of electric distribution in which there is no storage battery used for compensating for variations on the line, but in accordance with this invention the action of the storage battery must be taken into consideration and its effect on the booster, and also the effect due to reversing the fields of the booster to obtain the required regulation. There is a very intimate relation and interaction between the booster, the storage battery, the regulator and the line, all of which elements contribute to efficient and perfect regulation, and this booster constructed as described is especially suitable for the conditions to be met, in as much as the voltage of the booster is regulated in accordance with the relation between the load on the line and the load on the generator, while the direction and amount of the magnetization in the commutating poles is varied in accordance with the commutating requirements of the booster.

In the modification of the invention shown in Fig. 2, A, as before, represents the main generator, while $b'$, $c'$ represent respectively the positive and negative lighting buses, and $d'$, $e'$ represent the positive and negative power buses, $e'$ being simply a continuation of $c'$. B represents the storage battery connected across the power buses and C is the booster.

In Fig. 1 a differential booster system is illustrated for carrying out the invention, while in Fig. 2 a constant current booster system is illustrated also for carrying out the invention without departing from the principles involved or from the spirit of the invention, showing that the invention is equally applicable to both the differential and constant current booster systems. D represents a regulator having the constant pull magnet E constructed like that described in Fig. 1 and the variable resistance R controlled by the mercury and contacts $r$, the construction and operation of the regulator D being like that in Fig. 1. The coil $k$ of magnet E is connected directly in circuit with the power bus $d'$, through the auxiliary windings K on the interposed poles H and the armature I of the booster by means of wires 20 and 21. The shunt field windings J of the booster were connected in circuit by wires 22 and 23 between the points 24 and 25 and include the variable resistance R in circuit therewith so that variations of said resistance vary the shunt field of the booster. In accordance with this construction under normal load on the power bus bars $d'$ and $e'$, which load in this instance is represented by the motors $f'$, the combined voltage of the main generator A and booster C is just equal to the battery voltage and the current passed by the combined voltage of the generator and booster passes to the motors $f'$. The voltage of the power buses will vary from approximately that of the generator to a voltage which is the sum of the maximum voltage of the booster and that of the generator according to the load on the motors. When the load on the power buses increases beyond the normal the magnet core $h$ is attracted by the magnet E and resistance R is cut into the circuit of the field windings J, thereby weakening said field and reducing the voltage of the booster so that the battery B is enabled to discharge and compensate for the increased load on the line. On the other hand when the load on the power buses decreases below the normal the spring $g$ pulls the contact points $r$ into the mercury cup, thereby cutting resistance R out of the circuit of the fields J, strengthening said fields, and raising the voltage of the booster until the increased voltage on the power buses passes the normal current into the battery.

A great many of the conditions present in the differential booster system are also present in the constant current booster system, which co-act with the interpole booster and render the combination extremely efficient, while at the same time there are additional advantages in the constant current modification, some of which are as follows: In the operation of a constant current system with an ordinary booster it is necessary in order to avoid sparking at the booster to so arrange the parts of the system that under no conditions will the booster voltage drop to zero since the constant current booster armature is always passing a constant current and if this current passed at no voltage the booster would spark. The minimum voltage of the power bus bars will therefore be the voltage of the main generator plus the minimum allowable voltage of the booster. The number of cells of battery connected across the power bus bars will be such that at the maximum rate of discharge for which they may be called upon their voltage will not drop below this predetermined minimum. The maximum voltage of the power bus bars will be such that the constant current will pass into the fully charged battery. In the operation of my system the booster voltage can be reduced to zero without injury, hence the minimum voltage of the power bus bars will be substantially the minimum voltage of the main generator, and a less number of cells will be required on the power bus bars. A smaller booster will do the same work and the fluctuations of voltage on the power buses will be less while the motors will be subjected to a lower average voltage than usual. Under these conditions the regulation of the shunt winding will be in accordance with the demands of the work circuit while the strength of the interpoles will be maintained substantially constant in accordance with the substantially constant current flowing through the booster armature.

Of course, I am not to be understood as limiting myself to the construction and arrangement of circuits shown because obviously different arrangements of circuits and particularly the windings of the interpoles may be varied without departing from the spirit of the invention.

Fig. 3 is a modification of Fig. 2, showing a constant current booster system, in which the auxiliary windings K on the interposed pole pieces H are connected in shunt instead of in series. In this instance the wire 30 leads from the point 31 to the point 32 and there branches, the wire 33 passing to the auxiliary windings while the wire 34 passes to the main field windings. The current passes through the auxiliary field windings and out by the wire 35 through the hand rheostat 36 to the point 37. The current also passes through the main field windings J and out by wire 38, through the variable resistance R and by the wire 39 to the negative side of the generator. In accordance with this modification the coil k of the magnet E is connected in series with the armature I of the booster by the wires 20 and 21.

In the operation of the system shown in Fig. 3, the auxiliary shunt field winding on the booster is controlled by means of the hand rheostat 36, while the variable resistance R regulates and controls the main field windings J. The operation of the system is otherwise like that described in connection with Fig. 2 except that the strength of the interpoles must here be varied by hand rheostat 36 if the constant current maintained by regulator D is varied by altering the regulator adjustment.

My co-pending application No. 444,653, of July 21, 1908, covers the species of the present invention shown in Figs. 2 and 3, this present application being for the generic invention common to all the figures with specific claims also for the subject-matter of Fig. 1.

Obviously some features of this invention may be used without others and the invention may be embodied in widely varying forms, therefore, without limiting the invention to the devices shown and described, and without enumerating equivalents,

I claim and desire to obtain by Letters Patent the following:—

1. In a system of electric regulation the combination of the source of supply and work circuit, of a storage battery for compensating for variations on the work circuit, a booster connected to control the charge and discharge of the battery having an auxiliary field winding for compensating for armature reaction, and a main field winding for varying the direction and amount of voltage of the booster, and regulating means varying in accordance with changes on the work circuit for controlling the strength of said main field.

2. In a system of electric regulation the combination of the source of supply and work circuit, of a storage battery for compensating for variations on the work circuit, and a booster connected to control the charge and discharge of the battery, said booster having a main field whose strength and direction of magnetization varies in accordance with changes on the work circuit, and an auxiliary field whose strength and direction of magnetization vary in accordance with the amount and direction of current in the booster armature.

3. In a system of electric regulation the combination of the source of supply and work circuit, of a storage battery for compensating for variations on the work circuit, a booster connected to control the charge and discharge of the battery, having an auxiliary field responsive to the direction and amount of current in the booster armature for compensating for armature reaction, and a main field variable in direction and amount in accordance with changes on the work circuit for varying the direction and amount of voltage of the booster and regulating means for varying said main field in accordance with changes on the work circuit.

4. In a system of electric regulation, the combination of the source of supply and work circuit, of a booster having an auxiliary field for compensating for armature reaction and a main field responsive to changes on the work circuit, and regulating means varying in accordance with changes on the work circuit for controlling the strength of said main field.

5. In a system of electric regulation the combination of the source of supply and work circuit, of a booster provided with a main field whose strength and direction of magnetization vary in accordance with changes on the work circuit, and also having an auxiliary field whose strength and direction of magnetization vary in accordance with the current in the booster armature for compensating for armature reaction, and regulating means varying in accordance with changes on the work circuit for controlling said main field.

6. In a system of electric regulation the combination with a source of supply and work circuit, a booster provided with an auxiliary field for compensating for armature reaction and a main field for varying the direction and amount of voltage of the booster in accordance with changes on the work circuit.

7. In a system of electric regulation the combination with a source of supply and work circuit, of a booster provided with an auxiliary field for compensating for armature reaction and a main field whose strength and direction of magnetization vary in accordance with changes on the work circuit, and regulating means varying in accordance with changes on the work circuit for controlling said main field.

8. In a system of electric regulation the combination with a source of supply and work circuit, of a storage battery for compensating for variations on the work circuit, a booster connected to control charge and discharge of the battery, having an auxiliary field for compensating for armature reaction, and a main field whose strength and direction of magnetization vary in accordance with changes on the work circuit.

9. In a system of electric regulation the combination with a source of supply and work circuit, of a storage battery for compensating for variations on the work circuit, a booster connected to control the charge and discharge of the battery, provided with an auxiliary field for compensating for armature reaction, a main shunt field whose strength and direction of magnetization vary in accordance with changes on the work circuit, and a separate regulating means independent from said shunt field and connected in the main line, and variable in accordance with changes on the work circuit for controlling said main shunt field.

10. In a system of electric regulation, the combination with a source of supply and work circuit, of a booster provided with an auxiliary field for compensating for armature reaction, a main shunt field whose strength and direction of magnetization vary in accordance with changes on the work circuit, and an independent regulator responsive to changes on the work circuit for controlling said main shunt field.

11. In a system of regulation, the combination with a source of supply and work circuit, of a booster provided with an auxiliary field whose strength and direction of magnetization vary in accordance with the current in the booster armature, and also having a main shunt field whose strength and direction of magnetization vary in accordance with changes on the work circuit, and an independent regulator responsive to the electric condition of the circuits for controlling said main shunt field.

12. In a system of electric regulation, the combination with a source of supply and work circuit, of an auxiliary source of supply adapted to furnish or receive current from the main source of supply to compensate for changes in the work circuit, an auxiliary dynamo electric machine, the action of said auxiliary source of supply being controlled by two pairs of field poles influencing said auxiliary dynamo electric machine, of which one set of poles is varied in accordance with the demands of the work circuit, while the direction and amount of the magnetism of the other set of poles is varied in accordance with the commutating requirements of the dynamo electric machine.

13. In a system of electric regulation, the combination of a main source of supply, a work circuit and an auxiliary source of supply for compensating for changes in the work circuit, a dynamo electric machine having two sets of poles of which the strength of one set is varied in accordance with the fluctuations of the work circuit, while the strength and direction of magnetization of the other set is varied in accordance with the commutating requirements of the dynamo electric machine.

14. In a system of electric regulation, the combination of a source of supply and a work circuit, a storage battery for compensating for variations on the work circuit, a reversible booster connected to control the charge and discharge of the battery having a main field winding whose strength and direction of magnetization varies in accordance with changes on the work circuit, and an auxiliary field winding whose strength and magnetization vary in accordance with the amount and direction of current in the booster armature.

15. In a system of electrical distribution, the combination of the source of supply, a work circuit therefrom, a storage battery connected across the work circuit, a booster provided with an auxiliary field winding for compensating the armature reactions which is connected in series with the battery and with the booster armature, whereby the battery current traverses the auxiliary winding and armature in both directions alternately, means for supplying field current for the booster, and means for regulating and reversing the field current of the booster and thereby regulating and reversing the booster voltage to govern the charging and discharging of the battery.

In testimony whereof I have signed this specification in the presence of two subscribing witnesses.

JOSEPH BIJUR.

Witnesses:
  OLIN A. FOSTER,
  A. L. O'BRIEN.